June 29, 1926.
E. DEISTER
VEHICLE WHEEL
Filed Jan. 8, 1923
1,590,288
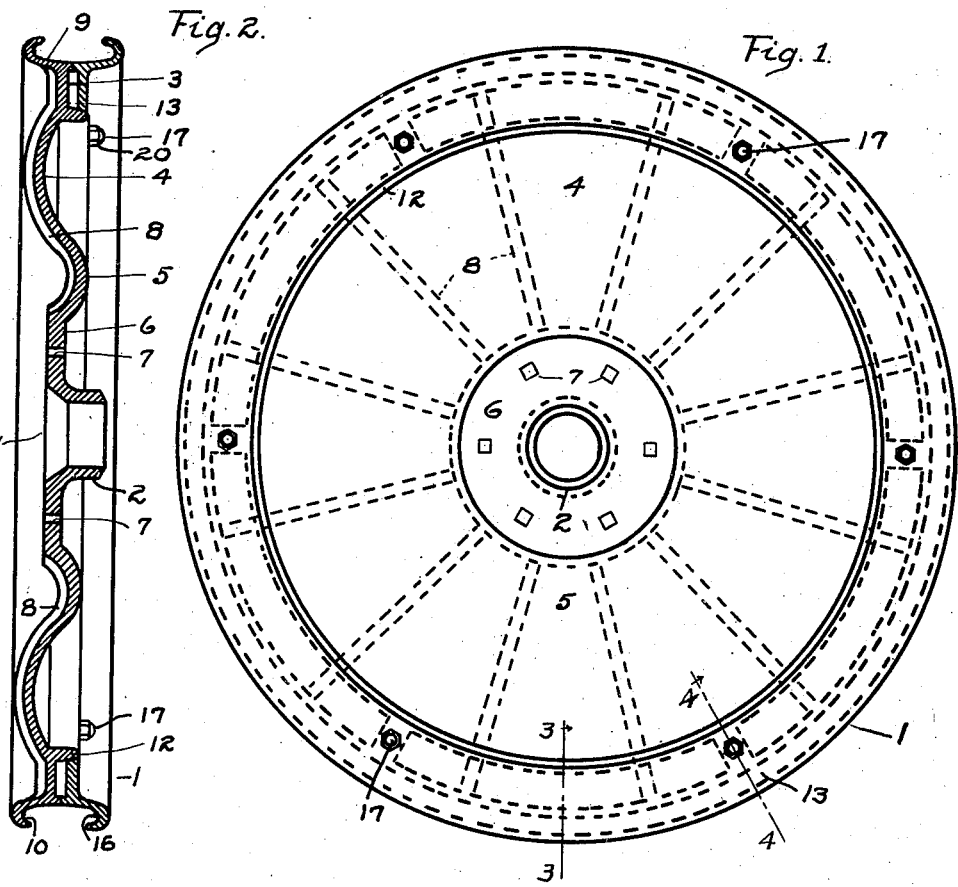
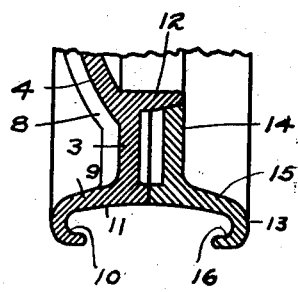
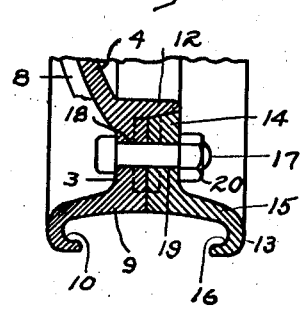
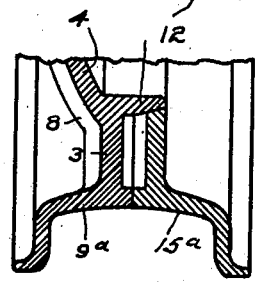
Emil Deister
INVENTOR
by
ATTORNEY Patented June 29, 1926.

1,590,288

UNITED STATES PATENT OFFICE.

EMIL DEISTER, OF FORT WAYNE, INDIANA.

VEHICLE WHEEL.

Application filed January 8, 1923. Serial No. 611,215.

The invention relates to vehicle wheels and particularly to wheels for motor vehicles. Its object is to provide a durable and economical wheel having great strength and having a novel form of rim upon which a tire is readily placed and by which the tire is firmly and securely clamped in proper position.

The invention consists primarily of a disk wheel having a peripherally split rim, one portion of which is attached in novel manner.

In the accompanying drawings I have illustrated the invention in simple form in which—

Figure 1 is an elevational view of a wheel embodying the invention; Fig. 2 a central vertical cross-section of the same; Fig. 3 a cross-section on line 3—3 of Fig. 1; Fig. 4 a cross-section on line 4—4 of Fig. 1 and Fig. 5 a cross-sectional view illustrating a modified form of the rim adapted for use in connection with a straight side tire.

The wheel is formed of a disk 1 having a central hollow portion or sleeve 2 for engagement on the usual hub commonly used on motor vehicles. Adjacent its peripheral edge is an annular vertically disposed portion or flange 3, the intermediate portion of the disk having the oppositely curved portions 4 and 5 and the central annular vertically disposed portion 6. Openings 7 are formed in the central portion 6 for the reception of bolts by which the disk is secured to the hub (not shown) upon which it may be mounted. On one side of the disk, preferably the inner side, are a suitable number of radial ribs 8 that extend from the portion 6 along the portions 5 and 4 and the flange 3 for reinforcing the disk.

An annular rim-forming flange 9 projects laterally from the outer peripheral edge of the flange 3, the ribs 8 terminating at their outer ends in said flange 9. The free edge of the flange 9 is turned over to form a clincher groove 10. The outer peripheral face 11 of the flange 9 is inclined or rounded toward the clincher groove 10 and this flange with its clincher groove forms substantially one-half of the rim of the wheel.

Suitably spaced from the flange 9 or outer peripheral edge of the flange 3 is an annular flange or seat 12 that projects from the flange 3 or other part of the disk 1, the said flange or seat 12 being on the opposite side of the disk relatively to the rim-forming flange 9. The three flanges 9, 3 and 12, in cross-section, resemble in appearance the letter Z or of a Z-bar. The outer peripheral face of the flange or seat 12 is slightly bevelled transversely and the flange forms a seat for the attachable rim member 13.

The attachable rim member 13 comprises a vertically disposed annular flange 14 having its inner peripheral face bevelled to cooperate with the bevelled seat 12, and an integral lateral flange 15. The flange 15 is formed with the clincher groove 16 and its outer peripheral face is inclined or rounded toward the groove 16 similarly to the fixed portion of the rim previously described. This attachable member 13 is secured in position by the bolts 17 that are inserted through registered openings 18 and 19 formed in the flanges 3 and 14 respectively. The flanges 3 and 14 are thickened adjacent the openings 18 and 19 so that when the members 13 is installed the said thickened portions will abut as shown in Fig. 4. At the same time the bevelled face of the flange 14 will engage the seat 12 and as the nuts 20 are tightened on the bolts 17 the member 13 will firmly engage not only the flange 3 but also the seat 12 and the opposing edges of the flanges 9 and 15 will also abut, thus forming a complete rim that is most rigid.

The rim, when the attachable member 13 has been assembled, presents a concave surface on its periphery to receive the tire. In assembling a tire on the rim, the attachable member 13 is first removed; then the tire is readily slipped on the fixed flange 9 of the rim and its bead engaged under the flange 10; then the attachable member 13 is restored and the nuts 20 tightened to draw the said member rigidly against the flange 3 and the seat 12. As the said member approaches the flange 3 the two inclined or rounded outer faces of the rim flanges 9 and 15 act as a wedge on the tire and the latter is thereby securely held in proper position and creeping of the tire is avoided. Of course, the bead on the tire adajcent the clincher groove 16 enters that groove as the member 13 approaches the flange 3 or it is readily guided into said groove.

In Fig. 5 I have shown the rim sections of the wheel indicated by 9ª and 15ª as adapted for use in connection with the straight side tire, clincher grooves being of no avail when a tire of the straight side type is used.

The annular flange or seat 12 reinforces the disk laterally and hence gives the wheel great lateral strength. Also the Z combination of this flange 12, the rim portion 9 and the intermediate portion or flange 3 of the disk affords great strength to the wheel and the wheel is therefore a rigid construction that will withstand road use.

What I claim is:

In a vehicle wheel, a disk having a circumferentially split rim, one portion of the rim being integral with the disk and the other portion being detachable therefrom, the outer peripheral faces of the two said portions, when attached, forming a continuous transversely concaved surface, an annular flange integral with the detachable rim portion and extending toward the central portion of the wheel and also having its inner periphery bevelled, a bevelled annular flange projecting laterally from the disk and adapted to be frictionally engaged by the bevelled periphery of the first named annular flange, and means extended through the disk and the first named annular flange to positively lock the rim portions together.

In witness whereof I have hereunto subscribed my name this 5th day of January, 1923.

EMIL DEISTER.